(12) United States Patent
Kim

(10) Patent No.: US 6,486,927 B1
(45) Date of Patent: Nov. 26, 2002

(54) LIQUID CRYSTAL DISPLAY TEST SYSTEM

(75) Inventor: Yong Keon Kim, Kyungki-do (KR)

(73) Assignee: DE & T Co., Ltd., Choongchungnam-Do (KR)

( * ) Notice: Subject to any disclaimer, the term of this patent is extended or adjusted under 35 U.S.C. 154(b) by 134 days.

(21) Appl. No.: 09/655,910

(22) Filed: Sep. 5, 2000

(30) Foreign Application Priority Data

| Nov. 19, 1999 | (KR) | 99-51554 |
| Nov. 19, 1999 | (KR) | 99-51555 |
| Nov. 19, 1999 | (KR) | 99-51556 |
| Nov. 19, 1999 | (KR) | 99-51557 |

(51) Int. Cl.[7] .............................................. G02F 1/133
(52) U.S. Cl. .............................. 349/1; 349/187; 445/24
(58) Field of Search ........................ 349/187; 324/770; 445/24, 60

(56) References Cited

U.S. PATENT DOCUMENTS

| 4,899,105 A | * | 2/1990 | Akiyama | 324/158 |
| 5,374,158 A | * | 12/1994 | Tessier et al. | 414/759 |
| 5,801,545 A | * | 9/1998 | Takekoshi et al. | 324/770 |
| 6,152,755 A | * | 11/2000 | Lee | 439/327 |
| 6,193,576 B1 | * | 2/2001 | Baynes et al. | 445/24 |
| 6,246,253 B1 | * | 6/2001 | Kang et al. | 324/770 |
| 6,286,202 B1 | * | 9/2001 | Asai et al. | 29/740 |
| 6,353,466 B1 | * | 3/2002 | Park | 349/58 |

* cited by examiner

Primary Examiner—James A. Dudek
(74) Attorney, Agent, or Firm—Rosenberg, Klein & Lee

(57) ABSTRACT

The present invention relates to an LCD (Liquid Crystal Display) test system, and more particularly to an in-line LCD test system capable of promptly and accurately testing LCDs. There is provided an LCD test system including a main frame, an index stage located adjacent to the main frame and having a stacker for supplying a plurality of LCD cassettes, a pre-alinger for aligning the LCD supplied from the stacker of the index stage; a carrier for transferring the aligned LCD so as to test the LCD, and a work table unit for setting such that the LCD transferred by the carrier is tested. According the LCD test system thus constructed, the LCD to be tested is automatically aligned, transferred and electrically contacts to the probe pins by the pre-aligner, the carrier and the work table unit, respectively. A series of such processes reduces the time required to test the LCD and increases in an test accuracy.

15 Claims, 13 Drawing Sheets

LIQUID CRYSTAL DISPLAY TEST SYSTEM

BACKGROUND OF THE INVENTION

1. Field of the Invention

The present invention relates to an LCD (Liquid Crystal Display) test system, and more particularly to an in-line LCD test system capable of promptly and accurately testing LCDs.

2. Description of the Conventional Art

Liquid crystal display (LCD) has generally a structure in which liquid crystals (LCs) are sandwiched by two glass substrates having transparent electrodes thereon. The LCs are compounds which have intermediate states between a liquid and a solid having molecules regularly arranged. The LCs are organic compounds having a long and thin rod-like molecular structure, with optical and dielectric anisotropic characteristics.

The LCDs are non-emissive types of display devices, and thus require a light source located outside a panel. The LCDs provide thinner flat panel than that of a CRT and achieve a full-color display, which lead to rapid practical use thereof.

The LCDs may be greatly classified into three types of TN, GH and TFT LCDs.

A TN type of LCD uses twisted nematic materials as LCs, widely used for displays, which are put into between two glass plates, each having transparent electrode films thereon. The production of such a TN type of LCD includes special processing called a rubbing processing applied to surfaces of the glass plates.

Secondly, a GH type of LCD is manufactured to permit a color display with the above-mentioned TN LCs as host to which dye is added as a guest. Finally, a TFT LCD is structured to have: a glass substrate on which pixels, each including a transistor and a display pixel (transparent) electrode, are arranged in a matrix manner and which transparent common electrodes are attached to; another opposing glass substrate having a color filter with a sequential arrangement of three primary colors in a matrix manner, each color being disposed corresponding to respective pixels, and transistors implemented by thin film FETs (Field Effect Transistors) for the purpose of driving a LC; and the LC inserted between said two glass plates.

Recently, thin film transistor liquid crystal display devices (TFT LCD) having lower power consumption and light-weight advantages have been used as display devices for various electronics, such as electric calculators, telephones, electronic organizer, notebook computers, etc. Also, a transition from 7-segment displays to dot-matrix displays results from an advance in LCD manufacturing and driving techniques, wherein the dot-matrix displays constitute a main trend of displays.

Since the number of electrodes increase in proportion of the amount of information to be displayed, the circuit connections between the LCD driving devices and the LCD become complicated. Accordingly, it is necessary to provide an apparatus for testing the circuit connections of the LCD.

A prior art LCD test system, mainly designed to test the 7-segment displays, conducts tests as to whether each segment of the LCD is properly connected or not, through the use of the key inputs to the test system.

However, a problem exists in that it cannot be tested all of segments of the dot-matrix type of the LCD as main displays currently used.

SUMMARY OF THE INVENTION

Therefore, it is an object of the present invention to provide an LCD test system capable of promptly and accurately testing LCDs and of minimizing failure of electrical contact to a tester.

According to the present invention, there is provided an LCD test system comprising: a main frame; an index stage located adjacent to the main frame and having a stacker for supplying a plurality of LCD cassettes; a pre-aligner for aligning the LCD supplied from the stacker of the index stage; a carrier for transferring the aligned LCD so as to test the LCD; and a work table unit for setting such that the LCD transferred by the carrier is tested.

According the LCD test system thus constructed, the LCD to be tested is automatically aligned, transferred and electrically contacts to the probe pins by the pre-aligner, the carrier and the work table unit, respectively. A series of such processes reduces the time required to test the LCD and increases in an test accuracy.

DETAILED DESCRIPTION OF THE INVENTION

To achieve the above-mentioned objects of the present invention, an LCD test system is characterized in that the system has an index stage having a stacker for supplying plural LCD cassettes and a conveyer for delivering the LCDs supplied from the stacker of the index stage and also the system has a pre-aligner for aligning the LCDs delivered from the LCD cassettes and work table unit for setting the LCDs such that the LCDs is tested.

A system for testing LCDs according to the present will be described in detail, with reference to the accompanying drawings.

Figure 1:
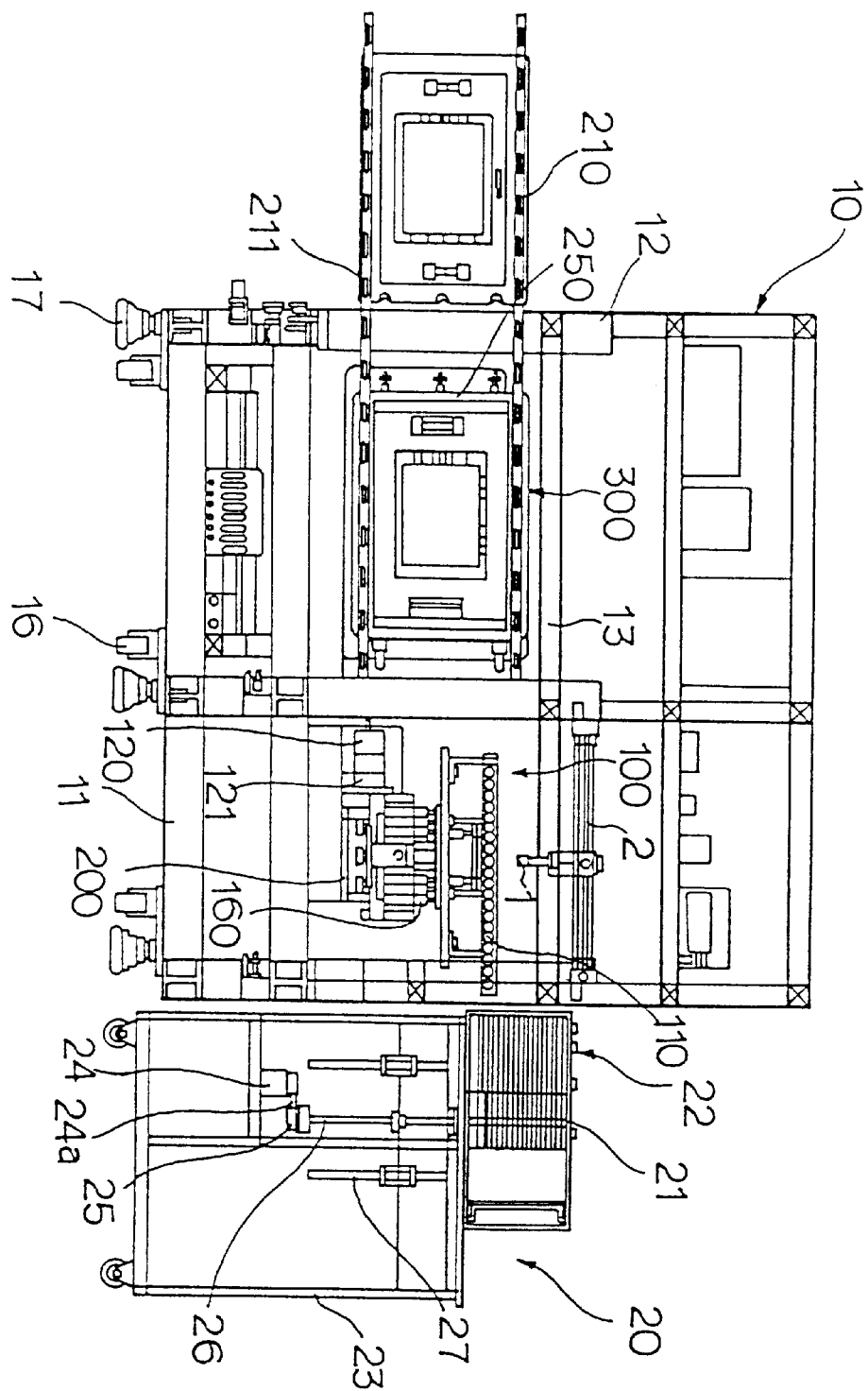
FIG. 1 is a front view showing an LCD test system according to the present invention.
Figure 2:
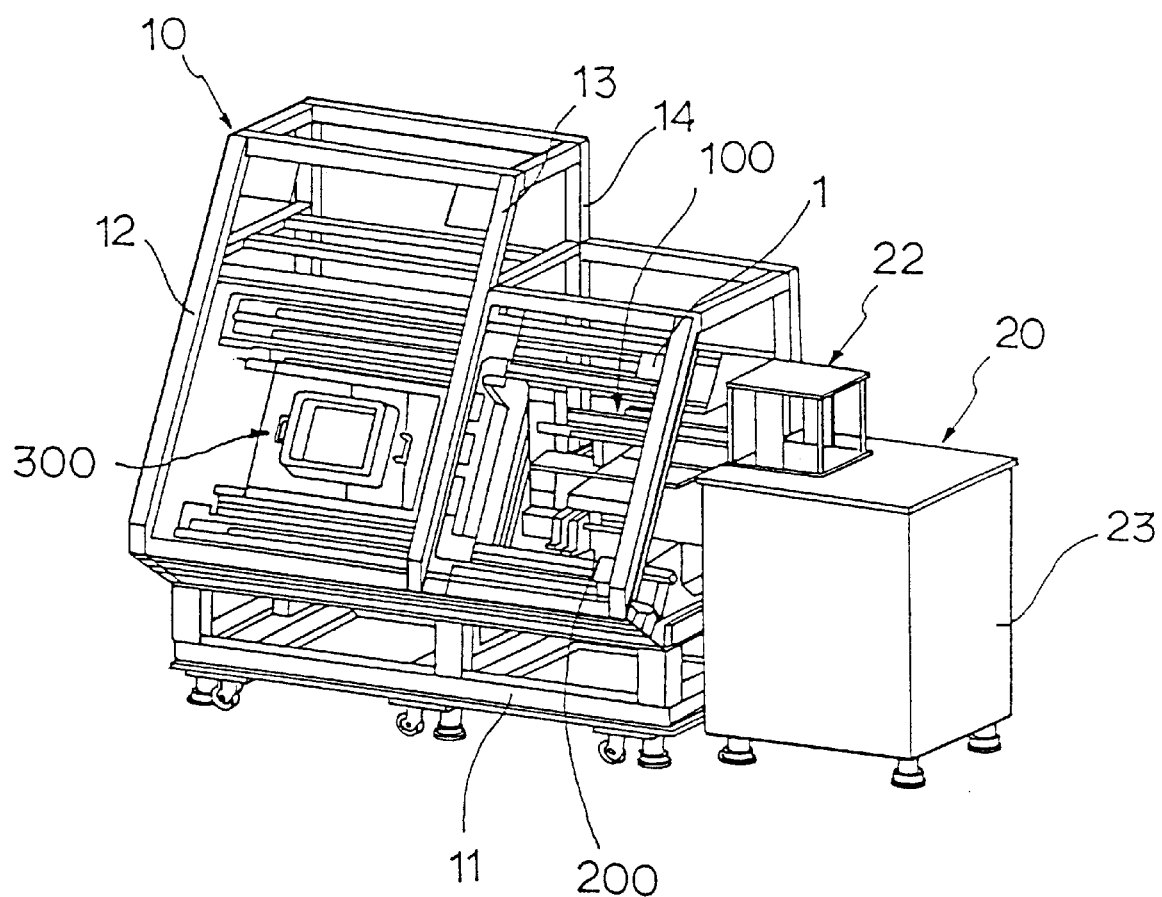
FIG. 2 is a side view of an LCD test system according to the present invention.
Figure 3:
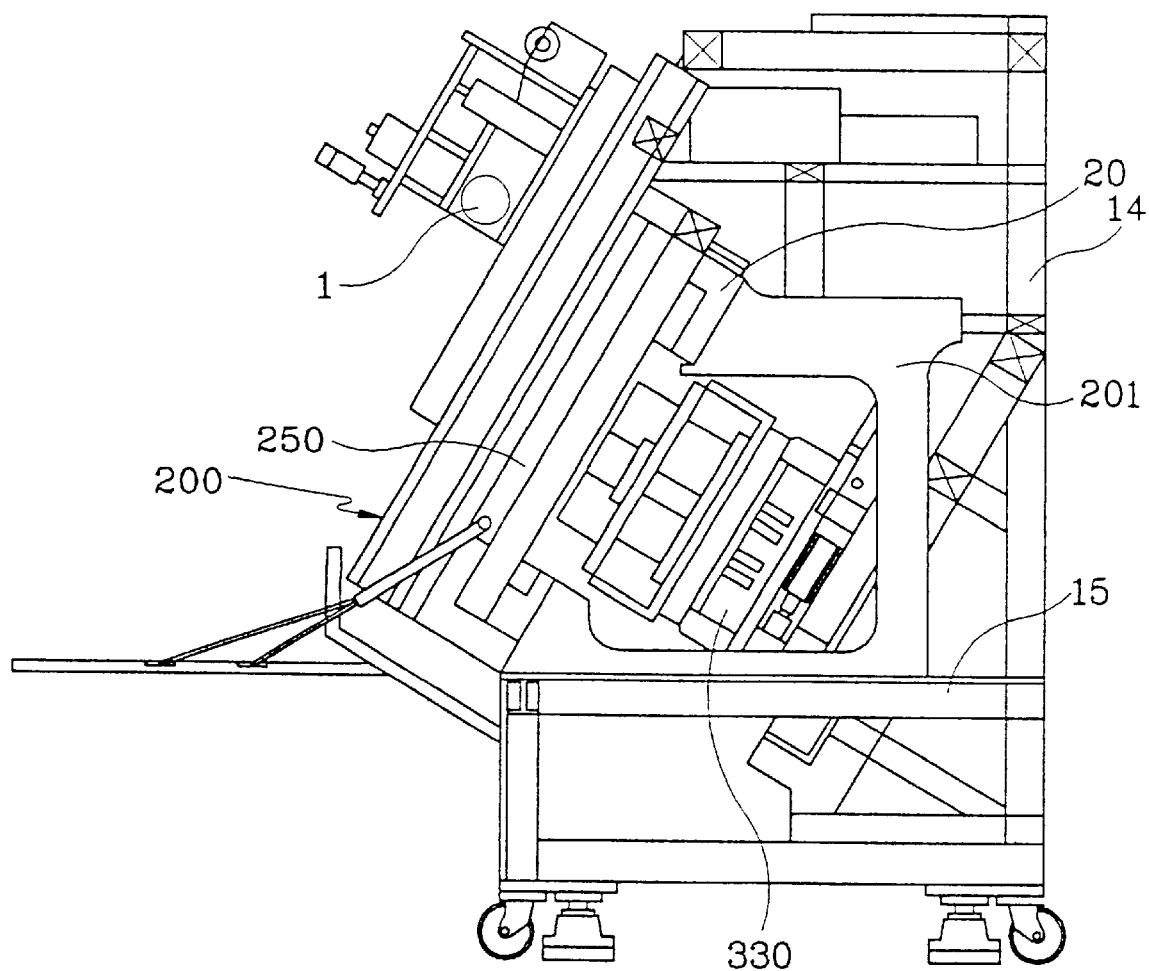
FIG. 3 is a perspective view of an LCD test system according to the present invention.

FIG. 1 is a front view showing a LCD testing system of the present invention, FIG. 2 is a right side view of the present invention, and FIG. 3 is a perspective view of the present invention.

As shown in FIGS. 1 to 3, the LCD test system according to the present invention comprises a main frame 10 comprised of a plurality of frame 11 to 15 being coupled to each other in traverse and longitudinal directions, an index stage 20 having a stacker for supplying LCDs (not shown) from plural LCD cassettes 21, and a conveyer 110 for delivering the LCDs Supplied from the stacker 22 of the index stage 20. Also, the LCD test system comprises a pre-aligner 100 for aligning the LCDs delivered from the LCD cassettes 21, a carrier 200 for transferring the aligned LCDs in order to test the LCDs, and a work table unit 300 for setting the LCDs such that the LCDs is tested.

In FIG. 1 showing the LCD test system according to the present invention, on the index frame 23 is located the stacker 22 which the LCD cassettes 21 are placed adjacent thereto. The LCD cassettes 21 adapted to be pushed by means of pusher (now shown) are transferred by the conveyer 110.

A motor 24 is installed below the stacker 22, and has a shaft 24a on which a pulley 25 is mounted. To the pulley 25 is coupled a ball screw 26 which is rotated when the motor 24 is activated. with the rotation of the ball screw, the LCDs contained in the LCD cassettes are sequentially supplied. Also, there is provided LM guides 27 adjacent to both sides of the ball screw 25, which the LM guides 27 helps a smooth lift motion.

On the vision frame 2 of the main frame 10, a vision unit 1 is installed which is used to identify the LCD transferred by way of the conveyer or to position the LCD.

The LCD transferred from the LCD cassettes 21 is aligned by the pre-aligner 100, and then the aligned LCD is transferred to the work table unit 300 provided at the left side of the carrier 200.

An elevating block 330 raises the LCD transferred to the work table unit 300 so as to electrically contact to the probe pins of the LCD tester and to be activated.

At a lower portion of the main frame 10, there are provided wheels for easy movement of the LCD test system, and foot masters 17 being movable upward and downward, for stabilizing the LCD test system at the moving position.

The main constitutional elements of the LCD test system according to the present invention will be described in detail.

Figure 4:
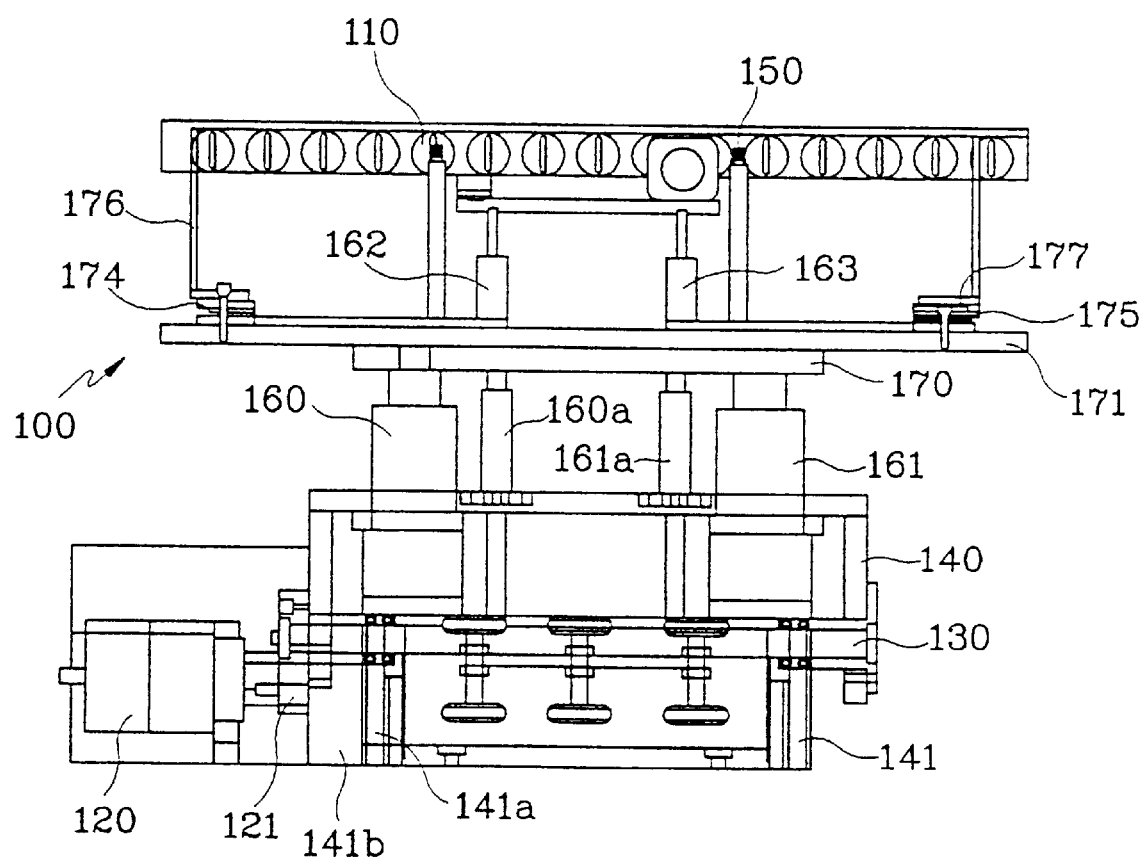
FIG. 4 is a front view showing a pre-aligner of an LCD test system according to the present invention.
Figure 5:
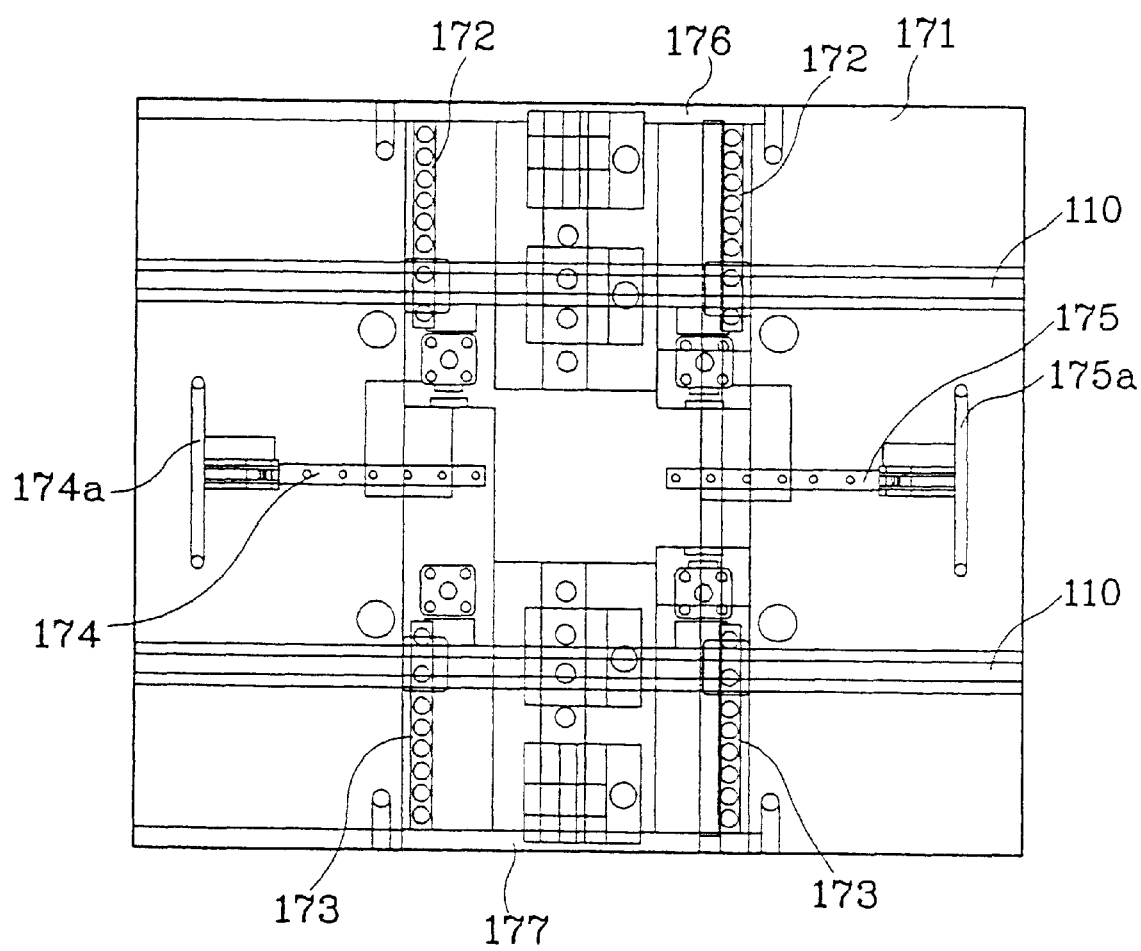
FIG. 5 is a plan view of FIG. 4.
Figure 6:
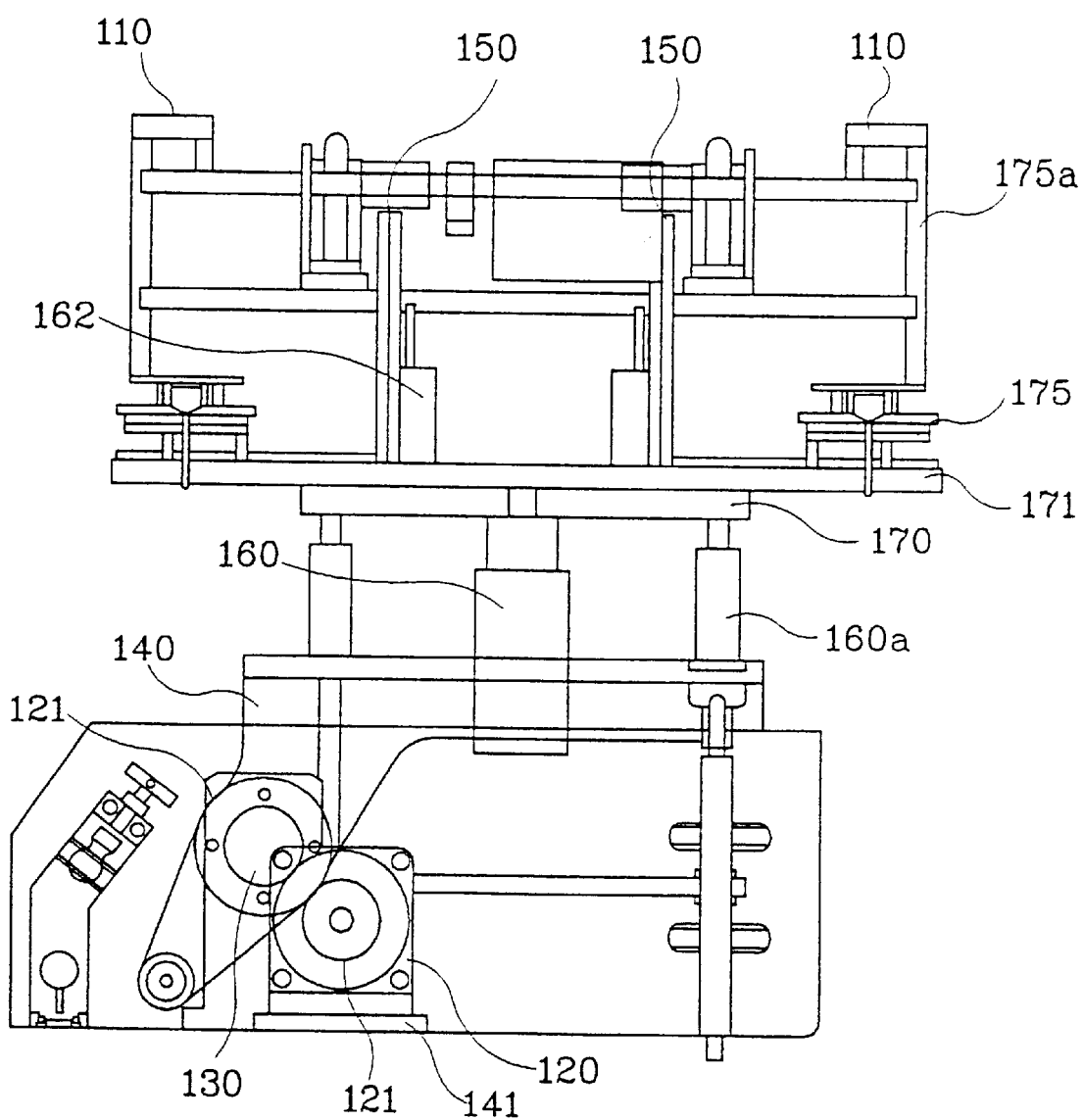
FIG. 6 is a side view of FIG. 4.
Figure 7:
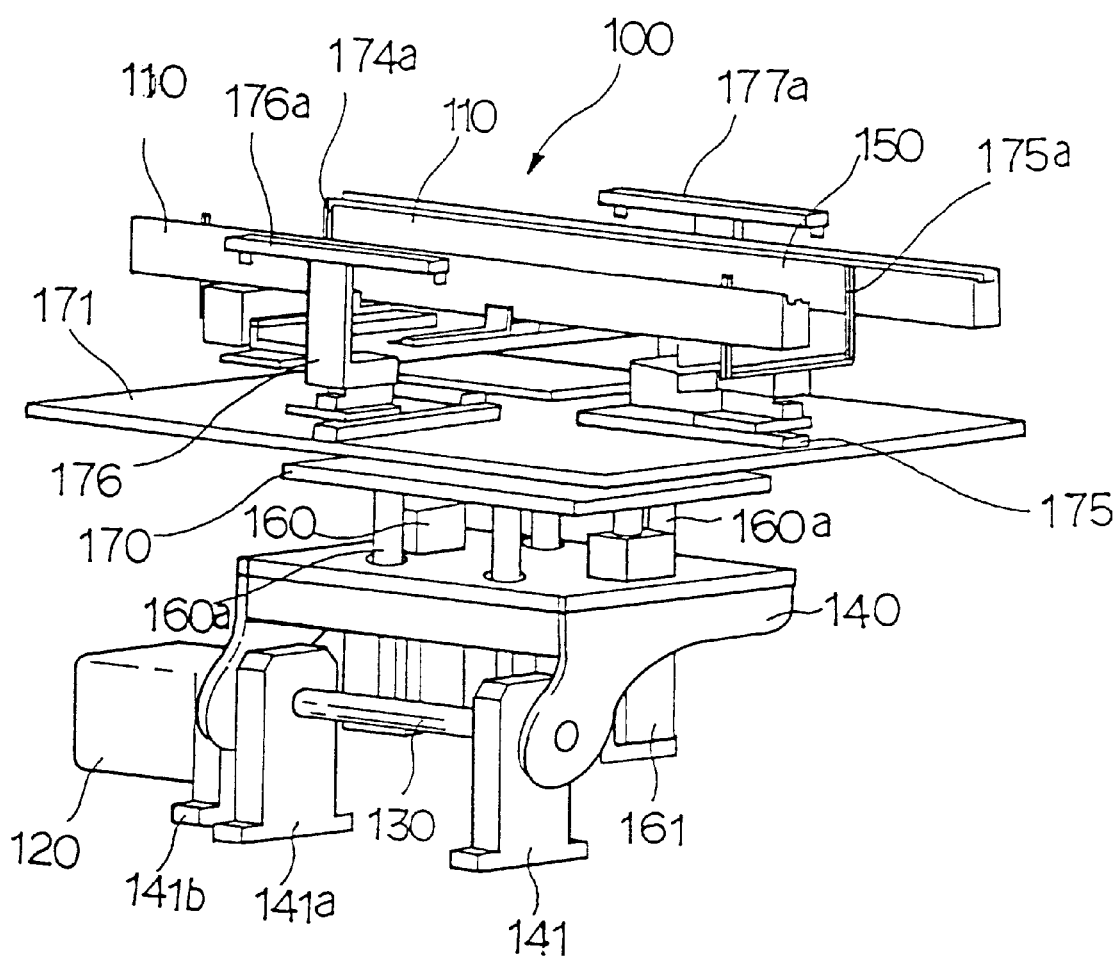
FIG. 7 is a perspective view of a pre-aligner applied to an embodiment of the present invention.
Figure 8:
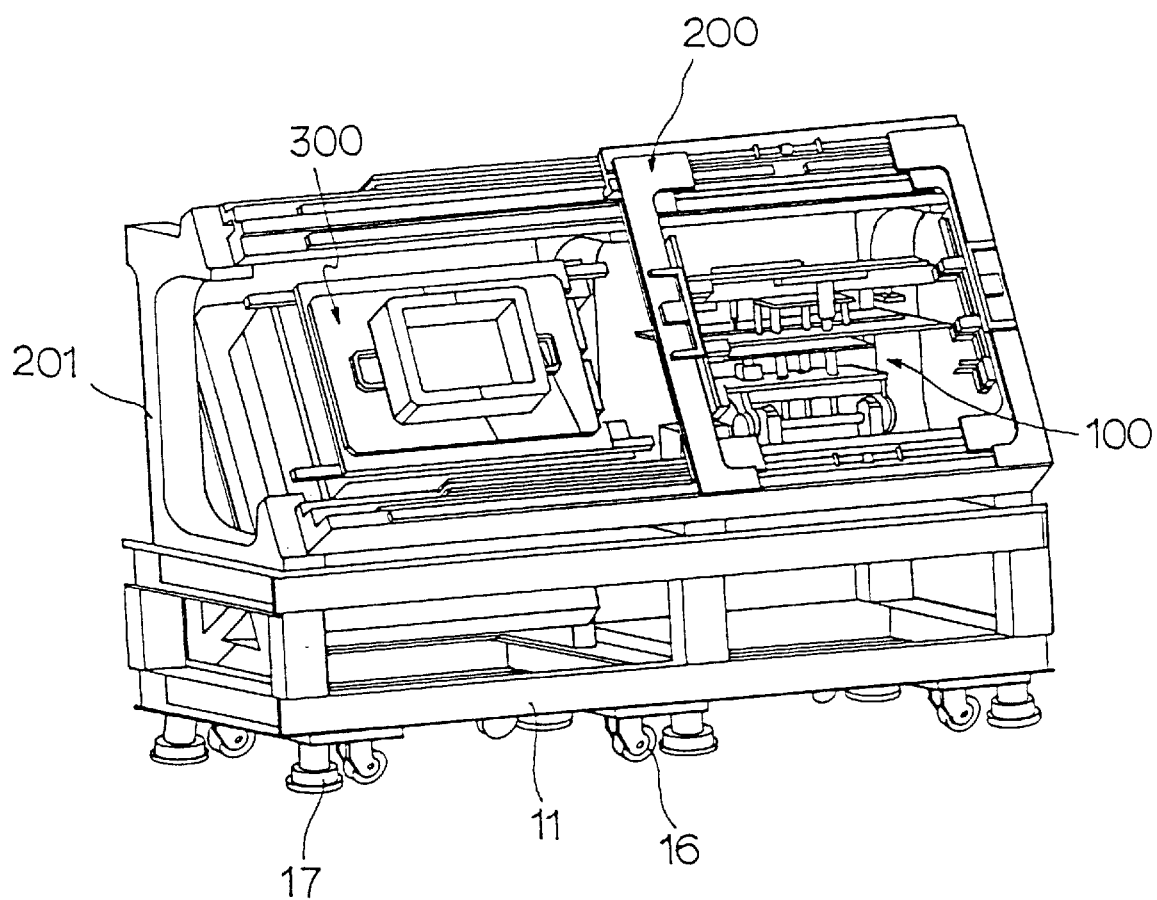
FIG. 8 is an enlarged perspective view showing a structure of a pre-aligner according to the present invention.

FIGS. 4 to 8 show the pre-aligner applied to the LCD test system according to the present invention. FIG. 4 is a front view of the pre-aligner of the LCD test system according to the present invention, FIG. 5 is a plan view of FIG. 4, FIG. 6 is a side view of FIG. 4, FIG. 7 is a perspective view of the pre-aligner applied to an embodiment of the present invention, and FIG. 8 is an enlarged perspective view of the pre-aligner of the present invention.

As shown in these figures, the pre-aligner 100 has a motor 120 having a shaft 130 extended from one side of the motor 120. A gear 121 is used to rotate the shaft 130 on which a rotation plate 142 and a bracket 141 are mounted.

A plurality of suction pads 150 (see FIG. 4) are provided inside and below a conveyer 110, in order to suck LCD which is transferred along the conveyer 110. A plurality of cylinders 160, 161 passing through the rotation plate 140 acts to push upward the LCD arrived on the conveyer 110, and a plurality of guides 160a, 161a adjacent to the cylinders are installed to pass through the rotation plate 140.

Above the cylinders 160, 161 guides 160a, 161a, there is provided lower plate 170 on which an upper plate 171 is fixedly provided.

The upper plate 171 has a top surface on which four LM blocks 172 to 175 are arranged in four directions, among which front and rear side LM blocks 172, 173 are fixedly provided with centering-bar blocks 176, 177. Each of the centering-bar blocks 176, 177 has a centering bar 176a (177a) fixed on the top thereof, by which the LCD can be aligned.

The right and left side LM blocks 174, 175 are also provided with fixing bars 174a, 175a for fixing the LCD having been transferred by the conveyer 110.

Lifting up the conveyer 110 is achieved by plurality of cylinders 162, 163 coupled to pierce into the upper plate 171.

Namely, two step lifting actions are provided using lower cylinders 160, 161 and upper cylinders 162, 163.

In the pre-aligner shown in FIG. 7, the LCD transferred by the conveyer 110 is sucked and fixed by the suction pads 150, whereby the LCDs sucked by the plural suction pads 150 does not drop and secures a stable location.

Following the LCD being fixed by the suction pads 150, the motor 120 starts to operate to rotate the shaft 130 engaged with the gear 121. The rotation of the shaft 130 causes the rotation plate 140 to be tilted/rotated by 60-degrees, thus permitting the raise of the cylinders 160 to 163 to reach the same position as the gripers 250, 251 of the carrier 200. This completes the steps required before the LCD delivers to the work table unit 300.

Figure 9:
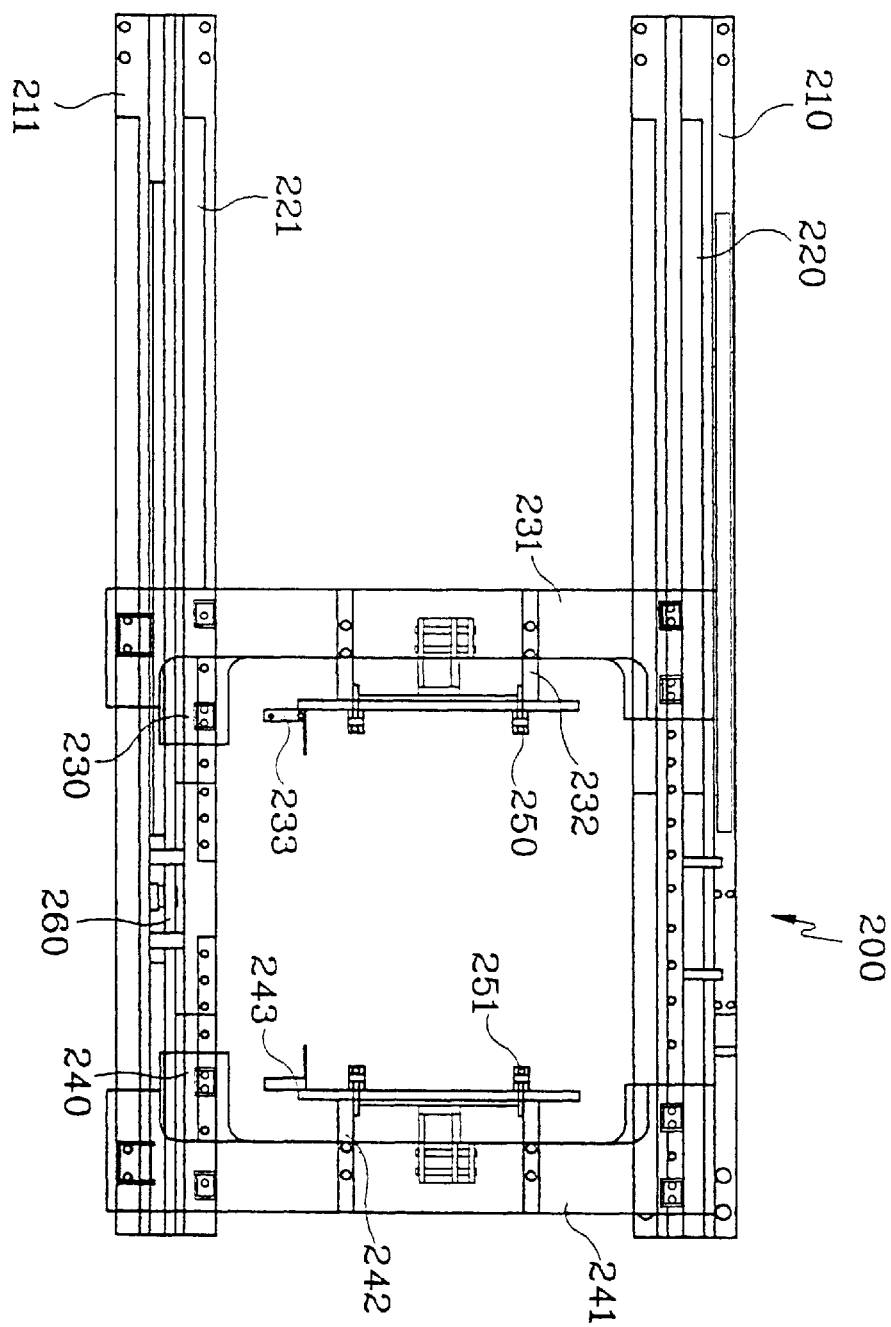
FIG. 9 is a plan view showing a structure of a carrier.
Figure 10:
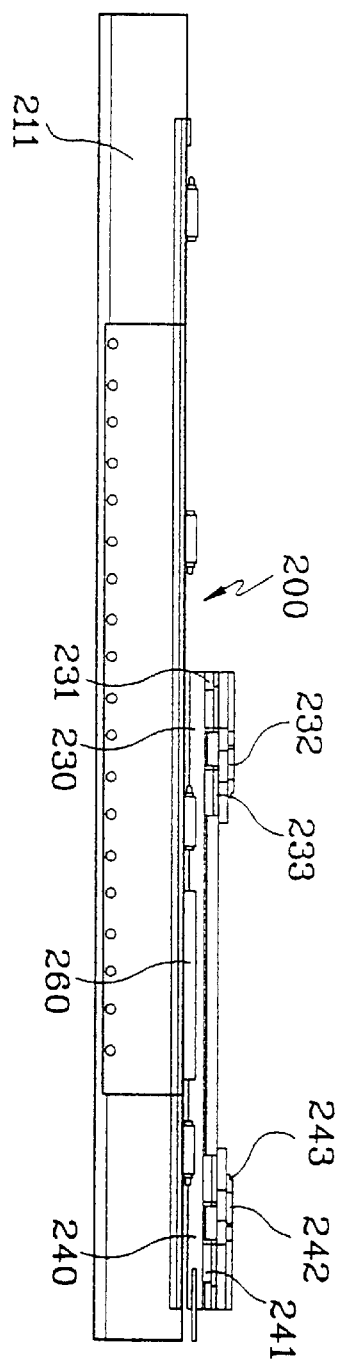
FIG. 10 is a front view of a carrier.
Figure 11:
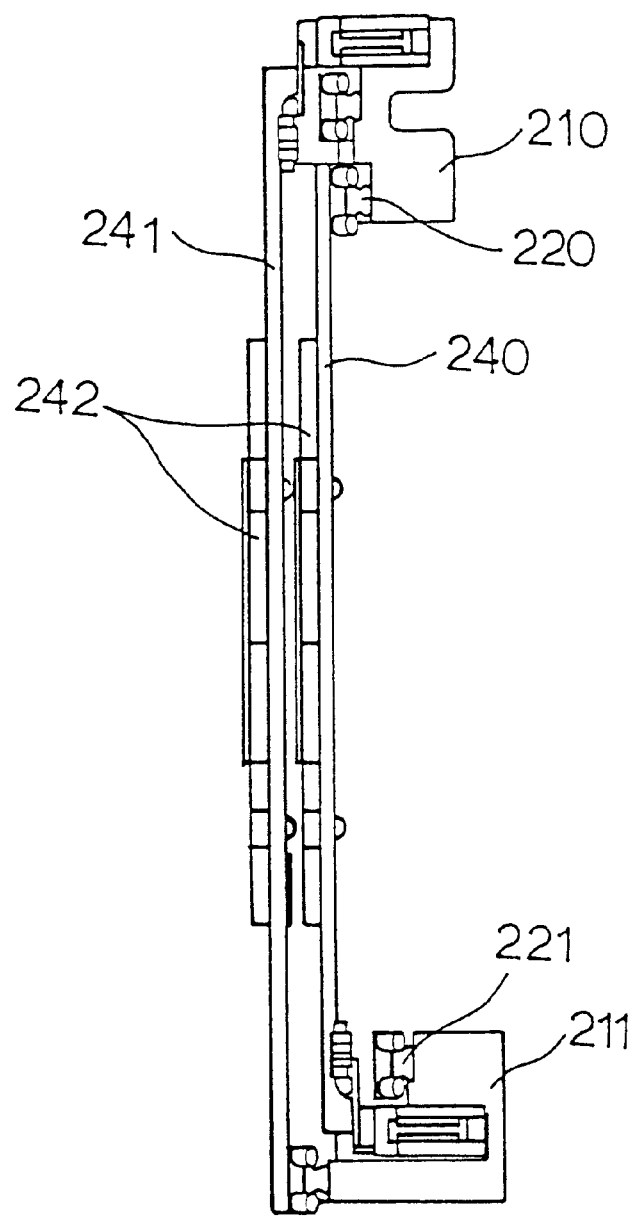
FIG. 11 is a side view of a carrier.
Figure 12:
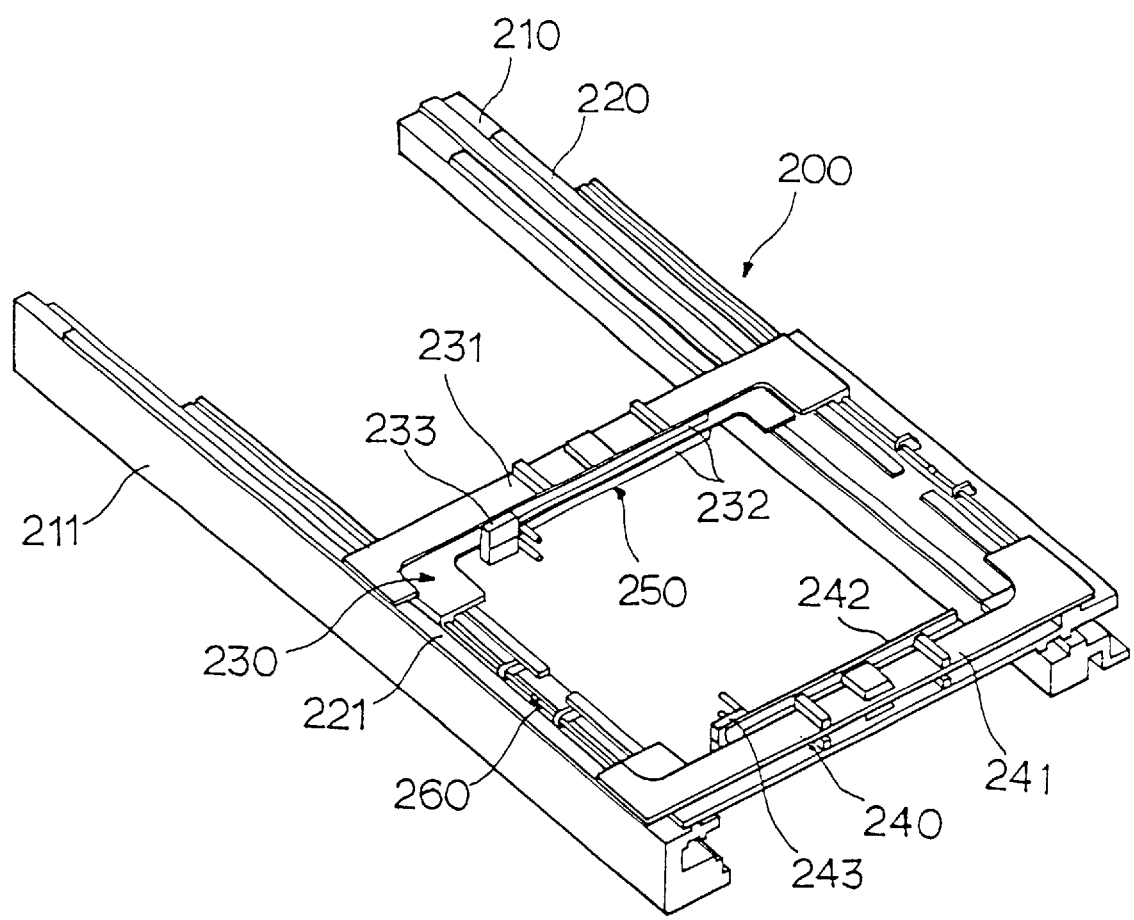
FIG. 12 is a perspective view showing a structure of a carrier according to the present invention.

FIGS. 9 to 12 show a structure of the carrier applied to the LCD test system in accordance with the present invention. FIG. 9 is a plan view showing the structure of the carrier according to the present invention, FIG. 10 is a front view of the carrier, FIG. 11 is a side view of the carrier and FIG. 12 is a perspective view of the carrier.

As shown in the figures, the carrier 200 to which the present invention is applied, has upper and lower rails 201 and 210 transversely disposed on, respectively, the upper and lower portions of the arch-like carrier frame 201 (see FIGS. 2 and 8).

The upper and lower rails 210, 211 have respective movable rails 220, 221 thereon adapted to be transversely movable on the rail 210, 211.

There are provided two pairs of gripper frames 230, 240 and 231, 241, one pair of gripper frame 230, 240 being disposed below the other pair of gripper frame 231, 241. The one pair of opposing gripper frames 230, 240 have respective ends, each being fixed to vertically bridge across the movable rails 220, 221.

To each of the gripper frame 230, 231, 240, 241 is fixedly provided brackets 232, 242 used to fix thereto a pair of opposing grippers 250, 151. The grippers 250, 251 are used to capture LCD delivered from the pre-aligner 100 and to transfer it. The grippers have fingers used for capturing both sides of the LCD.

To fix the LCD, there are provided at least one or more stoppers 233, 243 at one side of the brackets 232, 242 and on the respective gripper frames 230, 231, 240, 241.

The pair of opposing gripper frames 230, 231(240, 241) are coupled to each other by means of a ball screw 260 allowing the frames to be moved away from each other so as to maintain a certain distance therebetween. This operation makes it suitable for testing various sizes of LCDs by widening the spacing between the frames depending upon the sizes of the LCDs.

Figure 13:
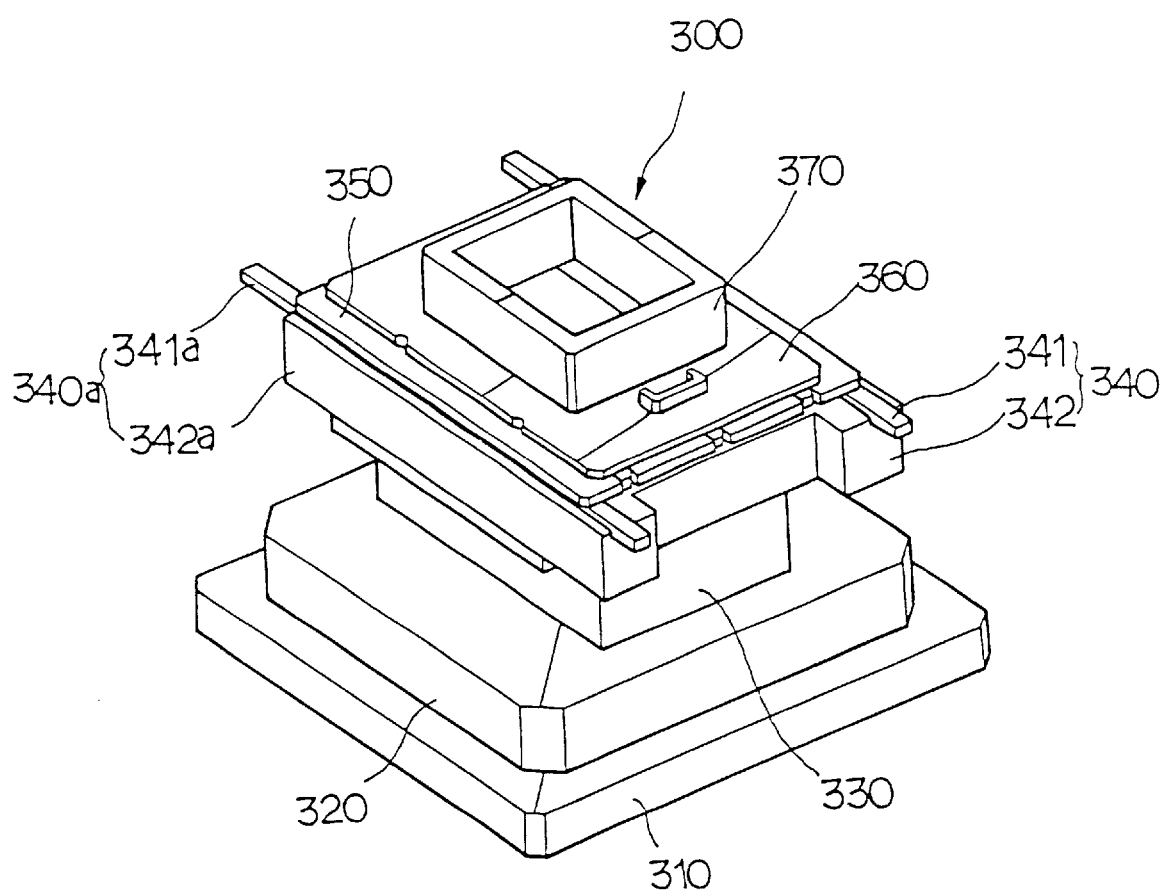
FIG. 13 is a perspective view shown a work table unit applied to an LCD test system according to the present invention.

FIG. 13 is a perspective view showing a work table unit applied to the LCD test system according to the present invention. The work table unit 300 has abase block 310 fixed to the main frame 10 and on which a movable block 320 is provided. Advantageously, the movable block 310 is adapted to move rightward, leftward, forward or backward, as well as to be rotated, or also to raise along Z-axis direction.

Over the movable block 320, there is arranged an elevating block 330 capable of being vertically elevated through the use of an internal ball screw provided therein.

LM guides 340, 340a comprised of LM guides 341, 341 and LM rails 342, 342a are disposed parallel to both sides of the elevating block 330. A support plate 350 is slidably located on both LM block 340, 340a, and has a work table plate 360 fixed thereon. LCD is located in an LCD fixing table 370, shaped like a box whose top is opened, and which is positioned on the work table plate 360.

As described above, the work table unit 300 fixed to the main frame 10 performs its operation after an initial alignment of the LCD by means of the pre-aligner 100 and subsequent transfer of the LCD by the carrier 200. If the LCD is placed on the table 370, the elevating block 330 below the table 370 elevates or lowers the LCD so as to promptly and accurately provides electrical contact to the probe pins (not shown).

Furthermore, the movable block 320 is arranged such that it moves rightward, leftward, forward or backward, rotates, or also vertically raises in order to makes it possible to complete the desired tests by accurately contacting to the probe pins or by moving and discharging the LCD successfully finished electrical contact to the probe pins.

The operation of the LCD test system according to the present invention will be described below. At the index stage 20, the pre-alinger 100 is loaded with a single LCD from the LCD cassette 21 by way of the conveyer 110. Then, the conveyer 110 of the pre-aligner 100 is lowered, where the accurate positioning of the LCD in the LCD cassette 21 is conducted.

Afterwards, a plurality of cylinders 160 to 163 of the pre-aligner 100 raise to rotate the pre-aligner 100 by 60-degrees such that the pre-aligner 100 is tilted with a certain slope.

The tiled pre-aligner 100 is moved upward along Z-axis until the loaded LCD reaches the same position as the grippers 250, 251 of the carrier 200.

When the LCD is placed in the same position relative to the grippers 250, 251, the grippers 250, 251 take the LCD and then move along the movable rails 220, 221 towards the work table unit 300. After the grippers 250, 251 holding the LCD arrived at the work table unit 300, the work table unit 300 is moved along Z-axis.

The LCD moved to the work table unit 300 is held by a clamp, and is vacuum-sucked by the work table unit 300. The vacuum sucked LCD is raised up to a position where the probe pins are provided for contacting to the LCD. Electrical contact of the LCD to the probe pins activates the LCD, thus completing the LCD test.

The grippers 250, 251 of the carrier 200 hold the test-finished LCD which will be again moved to the pre-aligner 100. To receive the moved LCD, the pre-aligner 100 raises.

Finally, the operator manually unloads the LCD, thus the LCD test being completed.

It is noted that the sequential procedures of loading the LCD from the index stage 20, aligning the LCD at the pre-aligner 100 and moving the LCD by means of the carrier 200 may be continued during the performance of the LCD test.

Unnecessary operations can be avoided due to the automatic processes provided by the pre-aligner 100, the carrier 200 and the work table unit 300.

As described above, the LCD test system in accordance with the present invention has the advantage that accurate tests of the LCDs can be performed by the prompt initial aligning of the LCD and the tilting using the pre-aligner. Also, since errors occurring in tilting the LCD can be reduced, the operational efficiency enhances, thus resulting in increase in the productivity.

In the LCD test, since the carrier is operated to promptly move the LCD to the work table unit and also reduces breakage of the LCDs, it has the advantage of prompt test and productivity of the products.

Further, with the use of the work table unit constructed according to the present invention providing the accurate contact of the LCD to the probe pins for performing the test, failure rate of the LCD test can advantageously be reduced. Also, since the LCD can be promptly and accurately moved, the productivity is improved, accordingly.

In consequence, since the faster LCD test is provided and the LCD performance can be accurately conducted, the reliability of the LCD test system and the operational efficiency is improved.

What is claimed is:

1. An LCD (Liquid Crystal Display) test system comprising:
   a main frame;
   an index stage located adjacent to the main frame and having a stacker for supplying a plurality of LCD cassettes;
   a pre-aligner for aligning the LCD supplied from the stacker of the index stage;
   a carried for transferring the aligned LCD so as to test the LCD; and
   a work table unit for setting such that the LCD transferred by the carrier is tested.

2. The LCD test system of claim 1, wherein the index stage comprises a pusher arranged adjacent thereto, used to supply the LCD cassette.

3. The LCD test system of claim 1, wherein the pre-aligner comprises:
   a rotation plate adapted to be tilted and provided in the main frame;
   a plate positioned on the rotation plate;
   elevating means coupled to the plate, for elevating the plate; and
   transferring means positioned on the plate, for transferring the LCD.

4. The LCD test system of claim 3, wherein the pre-aligner comprises:
   a plurality of LM blocks positioned on the plate;
   a plurality of centering-bar brackets, each being provided at a predetermined place of each of the LM blocks; and
   a plurality of centering-bars which are installed on top of said upper plate.

5. The LCD test system of claim 4, wherein fixing bars are provided to the LM blocks and serve to fix the LCD transferred by said transferring member.

6. The LCD test system of claim 3, wherein the rotation plate is provided such that the rotation plate is tilted/rotated by a predetermined angle in a predetermined direction when a driving source coupled to a shaft of a bracket is operated.

7. The LCD test system of claim 3, wherein the rotation plate is installed such that the rotation plate causes the LCD transferred from the LCD cassette to be tilted by 60-degrees.

8. The LCD test system of claim 3, wherein it comprises a plurality of suction pads mounted to said plate and for sucking the LCD transferred by the transferring means.

9. The LCD system of claim 1, wherein the carrier comprises:
   upper and lower rails fixedly disposed on the upper and lower portions of the carrier, respectively, at a certain spacing therebetween;

movable rails being slidable along the rails; and a pair grippers disposed on the movable rails at a certain interval, the grippers being slidable together with the movable rails, and for holding the transferred LCD.

10. The LCD test system of claim 9, wherein it comprises a ball screw permitting the pair of grippers to be slidable in left and right directions, in order to adjust an interval between the pair of grippers, the interval corresponding to a length of the LCD.

11. LCD test system of claim 9, wherein the grippers comprises at least one or more stoppers for fixing the LCD to one side of the gripper.

12. The LCD test system of claim 1, wherein the work table unit comprises:

a base block fixed to the main frame;

a movable block seated on top portion of the base block, adapted to move in a predetermined direction;

an elevating block being vertically elevated and arranged over the movable block;

a work table plate provided to the elevating block and which is movable in left and right directions by means of guides; and an LCD holding table placed on top portion of the work table plate and for holding the transferred LCD.

13. The LCD test system of claim 12, wherein the guides comprises LM rail and LM guide positioned on top of the LM rail.

14. The LCD test system of claim 13, wherein it comprises a support plate provided on top portion of the LM block and performing a guidance of transferring the work table plate.

15. The LCD test system of claim 12, wherein the work table unit is structured such that it performs two step operations by cylinders in order that the LCD contacts to the probe pins.

* * * * *